(12) United States Patent
Nakano et al.

(10) Patent No.: US 11,431,059 B2
(45) Date of Patent: Aug. 30, 2022

(54) BATTERY PACK

(71) Applicant: SANYO Electric Co., Ltd., Daito (JP)

(72) Inventors: Masaya Nakano, Osaka (JP); Jyunichi Fukumori, Hyogo (JP); Kazuaki Fukutome, Hyogo (JP); Hiroshi Arikawa, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 23 days.

(21) Appl. No.: 16/975,467

(22) PCT Filed: Feb. 8, 2019

(86) PCT No.: PCT/JP2019/004527
§ 371 (c)(1),
(2) Date: Aug. 25, 2020

(87) PCT Pub. No.: WO2019/163550
PCT Pub. Date: Aug. 29, 2019

(65) Prior Publication Data
US 2021/0020884 A1    Jan. 21, 2021

(30) Foreign Application Priority Data

Feb. 26, 2018  (JP) .............................. JP2018-031717

(51) Int. Cl.
*H01M 50/30* (2021.01)
*H01M 50/35* (2021.01)
*H01M 50/20* (2021.01)

(52) U.S. Cl.
CPC ......... *H01M 50/394* (2021.01); *H01M 50/20* (2021.01); *H01M 50/35* (2021.01)

(58) Field of Classification Search
CPC .... H01M 50/394; H01M 50/20; H01M 50/35; H01M 50/317; H01M 50/375; H01M 50/30
See application file for complete search history.

(56) References Cited

U.S. PATENT DOCUMENTS

2012/0274266 A1   11/2012   Yip

FOREIGN PATENT DOCUMENTS

| CN | 103824987 A | * | 5/2014 | .......... H01M 50/342 |
| CN | 206098513 U | | 4/2017 | |
| CN | 103824987 B | | 6/2017 | |
| EP | 2999026 A1 | | 3/2016 | |
| JP | S60-133575 U | | 9/1985 | |

(Continued)

OTHER PUBLICATIONS

The Extended (Supplementary) European Search Report dated Mar. 24, 2021, issued in counterpart EP Application No. 19757710.9. (8 pages).

(Continued)

*Primary Examiner* — Maria Laios
*Assistant Examiner* — Bartholomew A Hornsby
(74) *Attorney, Agent, or Firm* — WHDA, LLP (57) ABSTRACT

In a battery pack, a battery core pack is housed in an outer case where a gas discharge hole is closed by a breathable waterproof sheet, a design sheet is disposed to cover the breathable waterproof sheet, a gas groove is provided between the breathable waterproof sheet and the design sheet, and the gas groove communicates with a discharge side of the breathable waterproof sheet.

8 Claims, 5 Drawing Sheets

(56) References Cited

FOREIGN PATENT DOCUMENTS

| | | | | |
|---|---|---|---|---|
| JP | 2009-158444 A | | 7/2009 | |
| JP | 2013-168293 A | | 8/2013 | |
| JP | 2013168293 A | * | 8/2013 | .......... H01M 2/1077 |
| JP | 2014-517982 A | | 7/2014 | |
| WO | 2014/184993 A1 | | 11/2014 | |

OTHER PUBLICATIONS

International Search Report dated Mar. 12, 2019, issued in counterpart Application No. PCT/JP2019/004527. (1 page).

* cited by examiner

BATTERY PACK

TECHNICAL FIELD

The present invention relates to a battery pack with a waterproof structure.

BACKGROUND ART

A battery pack with a waterproof structure is used as a power source for an electric tool, an electrically assisted bicycle, an electric motorcycle, a hybrid electric car, an electric car, and the like, and also used for applications such as power storage at home, stores, and the like. The battery pack with the waterproof structure is characterized by being able to be used safely by blocking infiltration of water. The battery pack can achieve the waterproof structure by putting, in a packaging bag, a battery core pack in which a circuit substrate and the like are connected to a plurality of batteries and incorporating the battery core pack in an outer case (see PTL 1).

The battery pack that houses, in the outer case, the battery core pack housed in the packaging bag includes the large packaging bag with the waterproof structure in order to store the entire battery core pack, which increases costs of parts. In addition, there is a drawback that the battery core pack cannot be fixed at a fixed position in the outer case, and it takes time to dispose the battery core pack in the packaging bag at a predetermined position in the outer case, which also increases assembly costs.

The above drawbacks can be solved if the outer case has a sealing structure. However, since internal air pressure fluctuates due to temperature changes, the outer case with the sealing structure requires a structure that prevents fluctuations in internal pressure due to temperature changes and the like. This structure can be achieved by opening a ventilation window in the outer case and closing the ventilation window with a breathable waterproof sheet (see PTL 2). The breathable waterproof sheet allows air to pass therethrough and does not allow water to pass therethrough, and thus can allow air to pass therethrough to prevent the internal pressure from fluctuating while the waterproof structure is maintained.

CITATION LIST

Patent Literature

PTL 1: WO2014/184993 A
PTL 2: Unexamined Japanese Patent Publication No. 2009-158444

SUMMARY OF THE INVENTION

The battery pack in which the ventilation window of the battery pack is closed by the breathable waterproof sheet can prevent the internal pressure from fluctuating while the waterproof structure is maintained, but has a drawback that the breathable waterproof sheet is easily damaged. This is because the breathable waterproof sheet is required to have a property of allowing air to freely pass therethrough, and thus it is difficult to form the breathable waterproof sheet with a structure that is thick and hardly damaged.

The present invention has been made to solve such a problem, and an object of the present invention is to provide a battery pack capable of effectively preventing damage to a breathable waterproof sheet while a waterproof structure is achieved. In addition, another object of the present invention is to provide a battery pack capable of smoothly discharging high-temperature ejected gas discharged from an incorporated battery outside a case.

A battery pack of the present invention is a battery pack including battery core pack 2 housed in outer case 1 where gas discharge hole 3 is closed with breathable waterproof sheet 4, wherein design sheet 5 covering breathable waterproof sheet 4 is fixed to outer case 2, outer case 2 further includes gas groove 7 on adhesive surface 6 where design sheet 5 is fixed, and gas groove 7 communicates with a discharge side of breathable waterproof sheet 4.

The above battery pack is characterized by being capable of effectively preventing damage to the breathable waterproof sheet that air is allowed to permeate while the gas discharge hole is closed by the breathable waterproof sheet so that the outer case has a breathable waterproof structure, and further being capable of smoothly discharging high-temperature ejected gas ejected from a discharge valve of a battery in an abnormal state to an outside while the breathable waterproof sheet is protected. This is because, in the above battery pack, the design sheet is provided to cover the breathable waterproof sheet, the gas groove is provided between the design sheet and the adhesive surface, and the gas groove is coupled to the discharge side of the breathable waterproof sheet. The battery pack with this structure allows air to pass through the breathable waterproof sheet and diffuses the air passing through the breathable waterproof sheet with the gas groove to discharge the air to the outside when internal pressure of the outer case changes slowly due to temperature changes or the like. In addition, when the battery is in the abnormal state and the ejected gas instantaneously discharged from the discharge valve damages the breathable waterproof sheet, the battery pack diffuses, with the gas groove, the gas passing through the damaged breathable waterproof sheet to an inner surface of the design sheet, the diffused discharge gas pressurizes the design sheet from the inner surface over a large area to damage or peel off the design sheet, and is quickly discharged to the outside.

Furthermore, in the battery pack of the present invention, outer case 1 may include first adhesive surface 6A where breathable waterproof sheet 4 is attached, on an outer side of an outer peripheral edge of gas discharge hole 3, and further include second adhesive surface 6B where design sheet 5 is attached, on an outer side of an outer peripheral edge of first adhesive surface 6A, gas groove 7 may be provided on second adhesive surface 6B, first adhesive surface 6A may be disposed on an inner side of second adhesive surface 6B, and design sheet 5 attached to the second adhesive surface may have a larger area than an area of breathable waterproof sheet 4 attached to first adhesive surface 6A, and cover an entire surface of breathable waterproof sheet 4.

The above battery pack is characterized in that the large design sheet covers the entire surface of the breathable waterproof sheet, and damage can be reliably prevented. In addition, the ejected gas ejected from an abnormal battery can be diffused to a larger area with the gas groove and discharged to the outside.

In addition, in the battery pack of the present invention, a plurality of rows of gas grooves 7 may be provided on second adhesive surface 6B. Furthermore, in the battery pack of the present invention, gas grooves 7 may be disposed in a grid pattern.

Furthermore, in the battery pack of the present invention, large recess 11 may be provided on a surface of outer case 1, a bottom of large recess 11 may serve as second adhesive surface 6B, small recess 12 may be provided on second adhesive surface 6A, a bottom surface of small recess 12 may serve as first adhesive surface 6A.

Furthermore, in the battery pack of the present invention, large recess 11 may be deeper than a thickness of design sheet 5, and design sheet 5 may be attached to second adhesive surface 6B in a state where a surface of design sheet 5 does not protrude from the surface of outer case 1.

Furthermore, in the battery pack of the present invention, small recess 12 may be deeper than a thickness of breathable waterproof sheet 4, air layer 9 may be provided between breathable waterproof sheet 4 and design sheet 5, and air layer 9 may communicate with gas groove 7.

Since the air layer is provided between the breathable waterproof sheet and the design sheet, in the battery pack, the air that has passed through the breathable waterproof sheet is diffused in the air layer to be guided to the gas groove. In addition, since the ejected gas that permeates the damaged breathable waterproof sheet is diffused in the air layer to be guided to the gas groove, the battery pack is characterized by being capable of rapidly damaging or peeling off the design sheet with the ejected gas to discharge the ejected gas to the outside more rapidly.

BRIEF DESCRIPTION OF DRAWINGS

FIG. 2 is an exploded perspective view of the battery pack illustrated in

FIG. 1.

DESCRIPTION OF EMBODIMENT

An exemplary embodiment of the present invention will be described below with reference to the drawings. However, the following exemplary embodiment is merely an example of a battery pack for embodying the technical idea of the present invention, and does not limit a battery pack of the present invention.

The battery pack of the present invention is mainly mounted on an electric vehicle and supplies electric power to a driving motor. The present invention is used, for example, as a power source for an assisted bicycle, an electric motorcycle, an electric wheelchair, an electric tricycle, an electric cart, and the like. However, the present invention does not limit an application of the battery pack, and can also be used as a power source for various electric devices used outdoors such as an electric tool.

Figure 1:
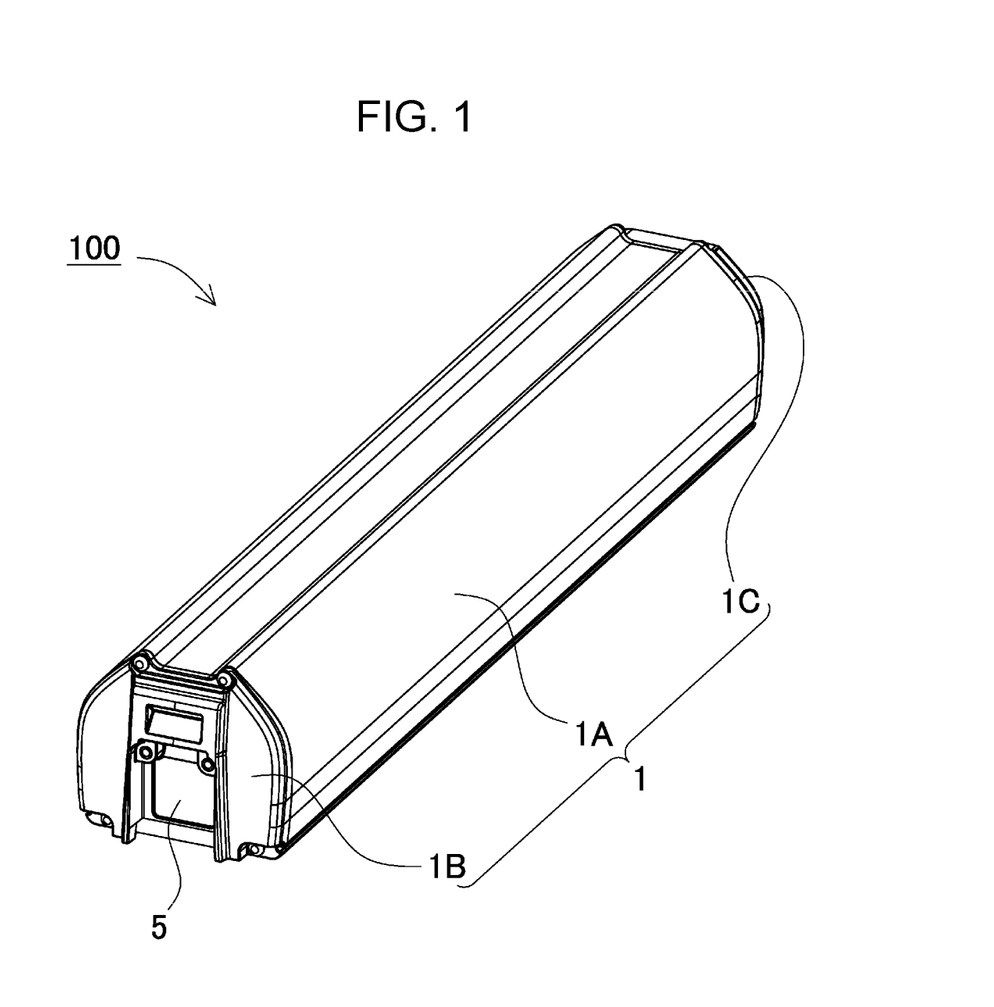
FIG. 1 is a perspective view of a battery pack according to an exemplary embodiment of the present invention.
Figure 2:
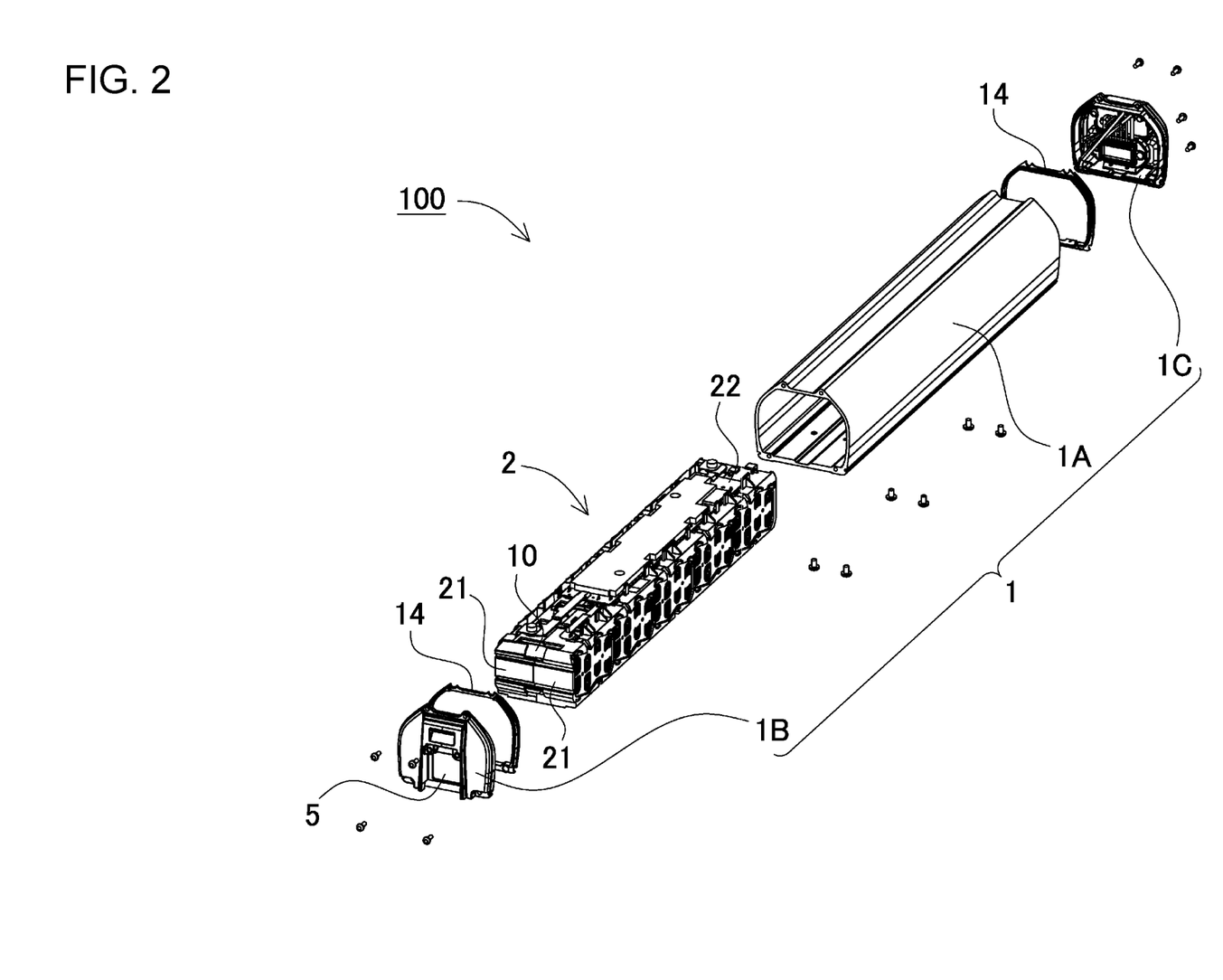

Battery pack 100 illustrated in a perspective view of FIG. 1 and an exploded perspective view of FIG. 2 incorporates battery core pack 2 in outer case 1. Outer case 1 has a waterproof structure that prevents water from infiltrating from an outside, and allows air to freely flow in and out to prevent fluctuations in internal pressure. In order to achieve the waterproof structure, in outer case 1, sub cases 1B, 1C are fixed in a watertight structure to opening portions at both ends of cylindrical main body case 1A via packings 14. In order to allow air to freely flow in and out while the waterproof structure is maintained, one sub case 1B of outer case 1 is provided with gas discharge hole 3 and gas discharge hole 3 is closed by breathable waterproof sheet 4.

Breathable waterproof sheet 4 is a sheet having innumerable fine voids through which air is allowed to pass and water is not allowed to pass. When the internal pressure of outer case 1 becomes higher than external pressure and a pressure difference occurs between an inside and the outside, breathable waterproof sheet 4 discharges internal air to the outside by the pressure difference, and on the contrary, when the internal pressure becomes lower than the external pressure and a pressure difference occurs between the inside and the outside, breathable waterproof sheet 4 allows external air to flow into the inside by the pressure difference, to prevent the fluctuations of the internal pressure. Since air expands in proportion to a temperature rise, if outer case 1 has a sealing structure in order to achieve the waterproof structure, the internal pressure rises when a temperature rises, and the internal pressure falls when the temperature falls.

Figure 3:
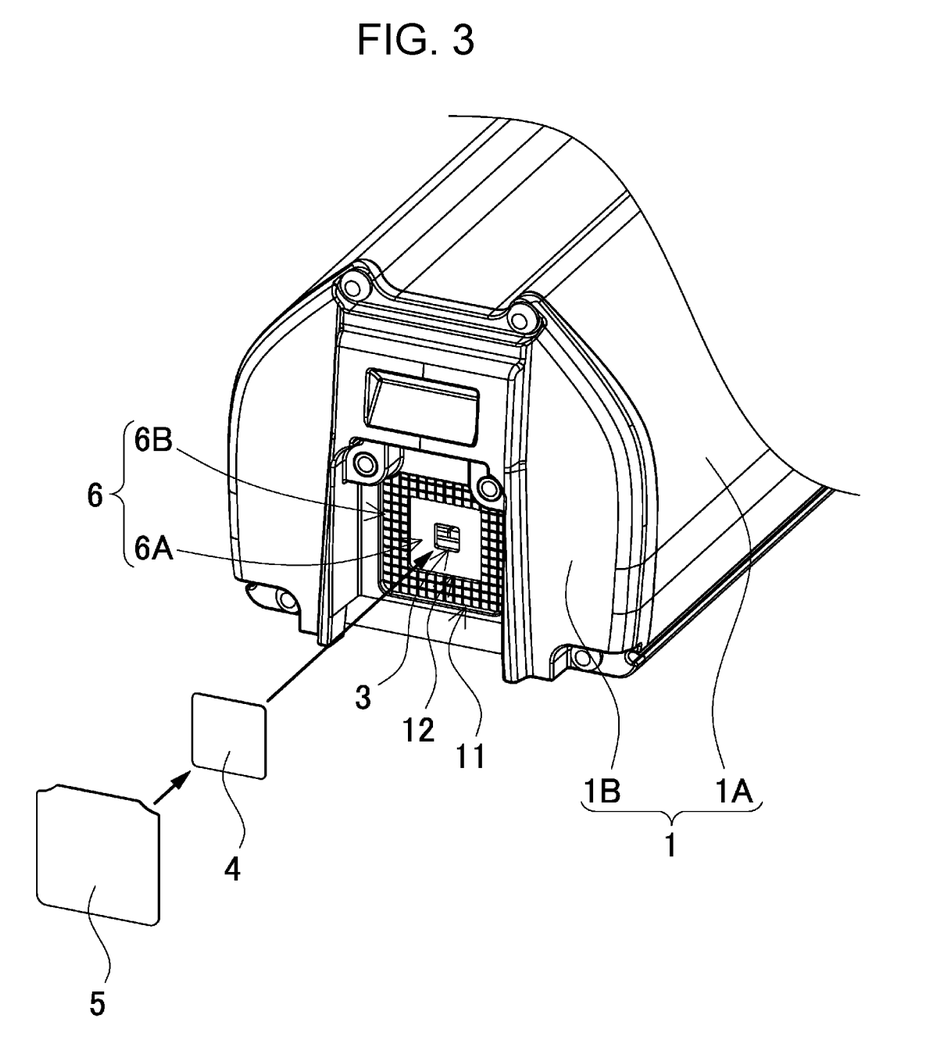
FIG. 3 is an enlarged exploded perspective view of an end portion of the battery pack illustrated in FIG. 1.

In outer case 1 illustrated in an enlarged exploded perspective view of FIG. 3, gas discharge hole 3 is closed with breathable waterproof sheet 4 to prevent the fluctuations in the internal pressure due to temperature changes. Breathable waterproof sheet 4 is a thin sheet through which air is allowed to pass, and is easily damaged, and if damaged, a waterproof function is lost. In outer case 1 of FIG. 3, a surface of breathable waterproof sheet 4 is covered with design sheet 5 in order to prevent damage to breathable waterproof sheet 4. Design sheet 5 is a tough sheet that has neither breathability nor water permeability and is superior in breaking strength to breathable waterproof sheet 4. Design sheet 5 is a plastic sheet, a metal sheet, or a laminated sheet of these. Design sheet 5 has a pattern or characters printed on its surface. Furthermore, design sheet 5 is a sheet having a larger area than an area of breathable waterproof sheet 4, and an outer peripheral edge of design sheet 5 is disposed on an outer side of an outer peripheral edge of breathable waterproof sheet 4 to cover and protect an entire surface of breathable waterproof sheet 4.

Figure 4:
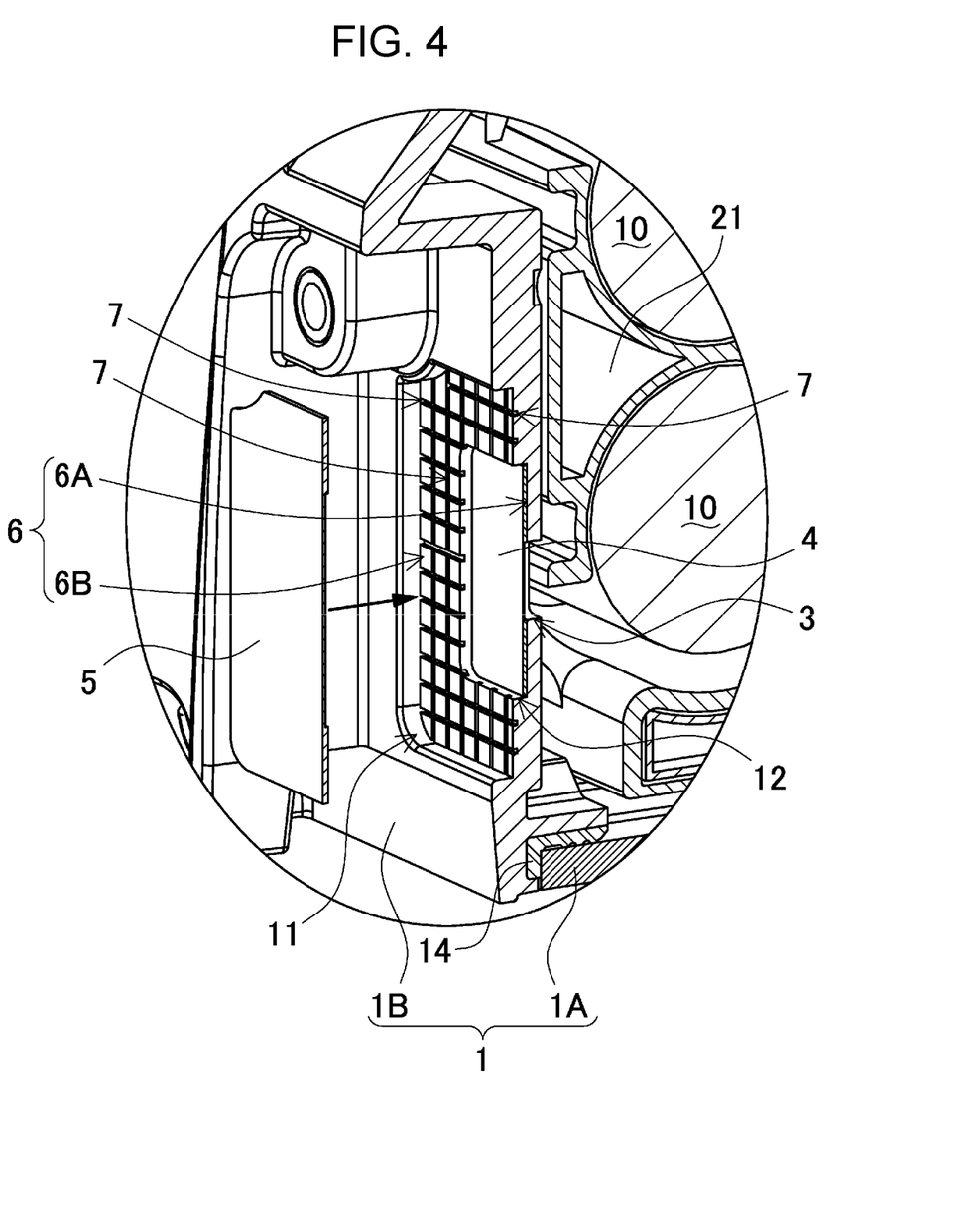
FIG. 4 is an exploded sectional perspective view of the end portion of the battery pack illustrated in FIG. 1.
Figure 5:
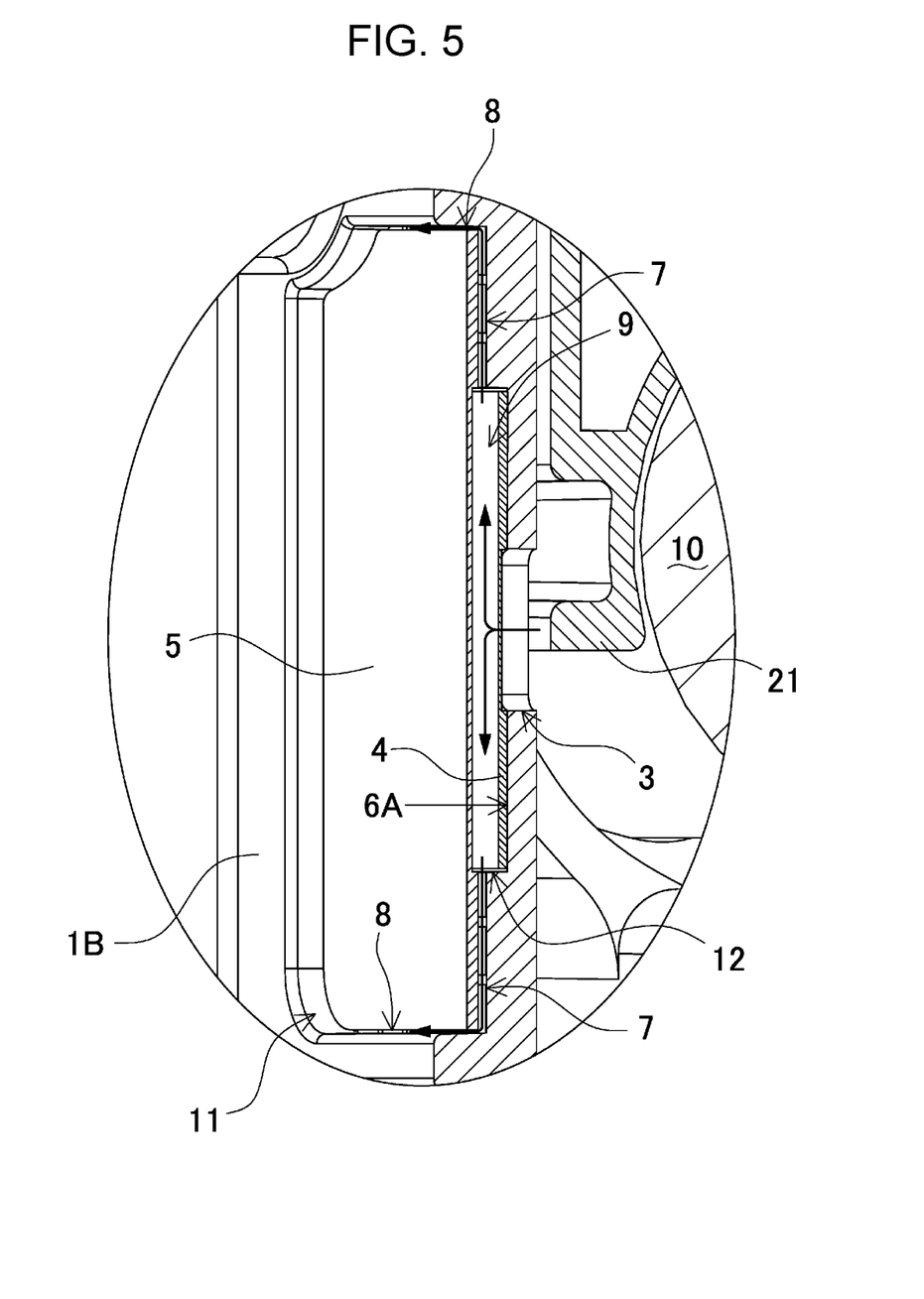
FIG. 5 is an enlarged sectional perspective view of the end portion of the battery pack illustrated in FIG. 1.

Sectional perspective views of FIGS. 4 and 5 illustrate adhesion portion between breathable waterproof sheet 4 and design sheet 5. Sub case 1B of outer case 1 is provided with gas discharge hole 3, and breathable waterproof sheet 4 is attached so as to close gas discharge hole 3. Sub case 1B, which is a part of outer case 1, is provided with first adhesive surface 6A to which breathable waterproof sheet 4 is attached, on an outer side of an outer peripheral edge of gas discharge hole 3.

First adhesive surface 6A is, as illustrated in FIGS. 3 to 5, a flat surface to which breathable waterproof sheet 4 is adhered and attached, which is sufficiently larger than an outer shape of gas discharge hole 3, and is disposed along the outer side of gas discharge hole 3 opening in a central portion. First adhesive surface 6A has a quadrangular shape, and is provided with quadrangular gas discharge hole 3 in a central portion. Breathable waterproof sheet 4 attached to first adhesive surface 6A closes gas discharge hole 3 opening in the central portion. Breathable waterproof sheet 4 is attached to first adhesive surface 6A without a gap by a method such as adhesion or welding to close gas discharge hole 3.

Sub case 1B of outer case 1 is provided with second adhesive surface 6B along an outer side of first adhesive surface 6A. Second adhesive surface 6B in the figure has a quadrangular shape, and an outer shape thereof is larger than an outer shape of first adhesive surface 6A, and first adhesive surface 6A is disposed in a central portion of second adhesive surface 6B. Second adhesive surface 6B has a quadrangular shape, and is provided with quadrangular first adhesive surface 6A in the central portion of second adhesive surface 6B, and second adhesive surface 6B is disposed along an entire circumference of first adhesive surface 6A. To second adhesive surface 6B, design sheet 5 is attached to cover and protect breathable waterproof sheet 4 that adheres to first adhesive surface 6A. Design sheet 5 is attached to second adhesive surface 6B by a method such as adhesion or welding.

Design sheet 5 is attached to second adhesive surface 6B and allows air to pass through design sheet 5 while protecting breathable waterproof sheet 4 from being damaged. Gas groove 7 is provided on second adhesive surface 6B in order to attach design sheet 5 to second adhesive surface 6B and allow air to pass through design sheet 5. Gas groove 7 is provided with an air passage on a back surface of design sheet 5 and allows air passing through breathable waterproof sheet 4 to pass through the air passage. Sub case 1B of FIGS. 3 and 4 is provided with a plurality of rows of gas grooves 7 in a grid pattern. Gas grooves 7 having this shape allow air to smoothly pass through the back surface of design sheet 5 and discharge the air to the outside. As illustrated in FIG. 5, design sheet 5 is provided with passage gap 8 for allowing air to pass between the outer peripheral edge of design sheet 5 and sub case 1B in a state of being attached to second adhesive surface 6B. The air that has passed through gas grooves 7 is discharged to the outside from air passage gap 8 as shown by arrows in FIG. 5. In addition, external air passes through passage gap 8 and gas grooves 7 and flows into the inside.

Outer case 1 illustrated in FIGS. 3 to 5 is provided with large recess 11 on a surface side of sub case 1B, and a bottom surface of large recess 11 serves as second adhesive surface 6B, to which design sheet 5 is attached. Second adhesive surface 6B is provided with small recess 12 in a central portion of the bottom surface of second adhesive surface 6B, and a bottom surface of small recess 12 serves as first adhesive surface 6A, to which breathable waterproof sheet 4 is attached. Gas discharge hole 3 is opened in the central portion of first adhesive surface 6A, and gas discharge hole 3 is closed by breathable waterproof sheet 4 attached to first adhesive surface 6A. Design sheet 5 attached to second adhesive surface 6B is provided with air layer 9 between design sheet 5 and breathable waterproof sheet 4. Air layer 9 diffuses the air that has permeated breathable waterproof sheet 4 and guides the air to gas grooves 7. In addition, in a state where gas is instantaneously discharged from incorporated battery 10, discharge gas damages breathable waterproof sheet 4 and diffuses in air layer 9 to pressurize an inner surface of design sheet 5 over a large area. The discharge gas that pressurizes the inner surface of design sheet 5 over a large area peels off or damages design sheet 5 and is instantaneously discharged to the outside.

As illustrated in FIGS. 3 to 5, a structure in which sub case 1B of outer case 1 is provided with large recess 11 so that the bottom surface of large recess 11 serves as second adhesive surface 6B, and second adhesive surface 6B is provided with small recess 12 so that the bottom surface of small recess 12 serves as first adhesive surface 6A can be provided with air layer 9 between breathable waterproof sheet 4 and design sheet 5 by making a depth of large recess 11 deeper than a thickness of design sheet 5 so that design sheet 5 attached to second adhesive surface 6B does not protrude from a surface of outer case 1, and making a depth of small recess 12 deeper than a thickness of breathable waterproof sheet 4 so that breathable waterproof sheet 4 does not protrude from second adhesive surface 6B.

The internal pressure fluctuations in outer case 1 due to the temperature changes are gentle, and causing a slight amount of air to flow in and out makes it possible to prevent the internal pressure fluctuations. However, when battery 10 is in an abnormal state, the internal pressure of outer case 1 may rapidly rise. This is because a discharge valve (not illustrated) opens and gas is instantaneously ejected in the abnormal state of battery 10. Battery 10 is provided with the discharge valve (not illustrated) in order to prevent damage to a battery case due to an abnormal rise in the internal pressure. When the internal pressure rises to a set pressure, the discharge valve is opened and ejects the gas from the inside to prevent the battery case from bursting due to the rise in the internal pressure. In the abnormal state of battery 10, the discharge valve is opened and instantaneously ejects a large amount of high-temperature gas, and thus, in this state, the internal pressure of outer case 1 rises rapidly. The gas discharged from the discharge valve that is opened is instantaneously and vigorously ejected to damage breathable waterproof sheet 4. The discharge gas that has damaged breathable waterproof sheet 4 further damages or peels off design sheet 5 and is quickly discharged from outer case 1 to the outside. Breathable waterproof sheet 4 and design sheet 5 are set to have breaking strengths or attachment strengths at which breathable waterproof sheet 4 and design sheet 5 are damaged or peeled off by a gas pressure ejected in the abnormal state of battery 10.

Battery core pack 2 incorporated in outer case 1 has a plurality of batteries 10 connected in series or in parallel. In battery core pack 2, the plurality of batteries 10 is disposed at a fixed position in plastic battery holder 21 in parallel postures. In battery core pack 2, circuit substrate 22 on which a protection circuit and the like for batteries 10 are mounted is fixed to battery holder 21. Each of batteries 10 of core pack 2 is a rechargeable lithium-ion secondary battery, but is not limited to a lithium-ion battery, and may be a non-aqueous electrolyte secondary battery other than the lithium-ion battery, a rechargeable battery such as a nickel metal hydride battery, or the like. Battery core pack 2 is fixed to outer case 1 and disposed in a fixed position without being housed in a waterproof bag. Battery core pack 2 is connected in a waterproof structure to an output terminal (not illustrated) provided to sub case 1C of outer case 1.

INDUSTRIAL APPLICABILITY

A battery pack of the present invention is suitably used as a power source with a waterproof structure for an electric tool, an electrically assisted bicycle, an electric motorcycle, a hybrid electric car, an electric car, and the like. In addition, the battery pack is suitably used for applications such as power storage at home, stores, and the like.

The invention claimed is:

1. A battery pack comprising a battery core pack housed in an outer case where a gas discharge hole is closed with a breathable waterproof sheet,
   wherein a design sheet covering the breathable waterproof sheet is fixed to the outer case,
   the outer case further includes a gas groove on an adhesive surface where the design sheet is fixed,
   wherein the outer case includes:
   a first adhesive surface where the breathable waterproof sheet is attached, on an outer side of an outer peripheral edge of the gas discharge hole, and
   a second adhesive surface where the design sheet is attached, on an outer side of an outer peripheral edge of the first adhesive surface,
   wherein the gas groove is provided on the second adhesive surface, and the gas groove communicates with a discharge side of the breathable waterproof sheet.

2. The battery pack according to claim 1, wherein
the first adhesive surface is disposed on an inner side of the second adhesive surface, and the design sheet attached to the second adhesive surface has a larger area than an area of the breathable waterproof sheet attached to the first adhesive surface, and covers an entire surface of the breathable waterproof sheet.

3. The battery pack according to claim 2,
wherein the gas groove includes a plurality of the gas grooves, and the plurality of the gas grooves comprise a plurality of rows of the plurality of the gas grooves provided on the second adhesive surface.

4. The battery pack according to claim 3,
wherein the plurality of the gas grooves are disposed in a grid pattern.

5. The battery pack according to claim 2,
wherein a large recess is provided on a surface of the outer case,
a bottom of the large recess serves as the second adhesive surface,
a small recess is further provided on the second adhesive surface, and
a bottom surface of the small recess serves as the first adhesive surface.

6. The battery pack according to claim 5,
wherein the large recess is deeper than a thickness of the design sheet, and
the design sheet is attached to the second adhesive surface in a state where a surface of the design sheet does not protrude from the surface of the outer case.

7. The battery pack according to claim 5,
wherein the small recess is deeper than a thickness of the breathable waterproof sheet,
an air layer is provided between the breathable waterproof sheet and the design sheet, and the air layer communicates with the gas groove.

8. The battery pack according to claim 1,
wherein the design sheet, viewed in a thickness direction thereof, overlaps an entire width of the gas groove formed in the second adhesive surface.

* * * * *